(12) United States Patent
Ye et al.

(10) Patent No.: US 12,223,433 B2
(45) Date of Patent: Feb. 11, 2025

(54) UNSUPERVISED LEARNING METHOD FOR GENERAL INVERSE PROBLEM AND APPARATUS THEREFOR

(71) Applicant: KOREA ADVANCED INSTITUTE OF SCIENCE AND TECHNOLOGY, Daejeon (KR)

(72) Inventors: JongChul Ye, Daejeon (KR); Byeongsu Sim, Daejeon (KR); Gyutaek Oh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 822 days.

(21) Appl. No.: 17/332,696

(22) Filed: May 27, 2021

(65) Prior Publication Data
US 2022/0027741 A1 Jan. 27, 2022

(30) Foreign Application Priority Data
Jul. 20, 2020 (KR) ........................ 10-2020-0089410

(51) Int. Cl.
*G06N 3/088* (2023.01)
*G06F 18/214* (2023.01)
*G06N 3/045* (2023.01)

(52) U.S. Cl.
CPC ........... *G06N 3/088* (2013.01); *G06F 18/214* (2023.01); *G06N 3/045* (2023.01)

(58) Field of Classification Search
None
See application file for complete search history.

(56) References Cited

PUBLICATIONS

Sim, et al., Optimal Transport Structure of cycleGAN for Unsupervised Learning for Inverse Problems, 2020 IEEE International Conference on Acoustics, Speech and Signal Processing (ICASSP 2020), May 8, 2020, pp. 1-4 (Year: 2020).*
Lim, et al., CycleGAN with a Blur Kernel for Deconvolution Microscopy: Optimal Transport Geometry, arXiv:1908.09414v3, Jul. 8, 2020, pp. 1-12 (Year: 2020).*
Sim, B., et al., "Optimal Transport, CycleGAN, and Penalized LS for Unsupervised Learning in Inverse Problems", Department of Mathematical Sciences, https://arxiv.org/abs/1909.12116, Sep. 25, 2019.

* cited by examiner

*Primary Examiner* — Wilbert L Starks
(74) *Attorney, Agent, or Firm* — CHRISTENSEN O'CONNOR JOHNSON KINDNESS PLLC

(57) ABSTRACT

Disclosed are an unsupervised learning method and an apparatus therefor applicable to general inverse problems. An unsupervised learning method applicable to inverse problems includes receiving a training data set and training an unsupervised learning-based neural network generated based on an optimal transport theory and a penalized least square (PLS) approach using the training data set, wherein the receiving of the training data set includes receiving the training data set including unmatched data.

9 Claims, 7 Drawing Sheets

UNSUPERVISED LEARNING METHOD FOR GENERAL INVERSE PROBLEM AND APPARATUS THEREFOR

CROSS-REFERENCE TO RELATED APPLICATIONS

A claim for priority under 35 U.S.C. § 119 is made to Korean Patent Application No. 10-2020-0089410 filed on Jul. 20, 2020, in the Korean Intellectual Property Office, the entire contents of which are hereby incorporated by reference.

BACKGROUND

Embodiments of the inventive concept described herein relate to an unsupervised learning technique applicable to general inverse problems, and more specifically, to an unsupervised learning method capable of solving an inverse problem through unsupervised learning and an apparatus therefor.

Inverse problems are ubiquitous in computer vision, biomedical imaging, scientific discovery, etc. In inverse problems, a noisy measurement $y \in Y$ from an unobserved image $x \in X$ is modeled by the following [Equation 1]:

$$y = Hx + u \qquad \text{[Equation 1]}$$

where w is the measurement noise, and $H: X \to Y$ is the measurement operator.

In inverse problems originating from physics, the measurement operator is usually represented by an integral equation as in the following [Equation 2]:

$$Hx(r) := \int_{R^d} h(r,r') x(r') dr', r \in D \subset R^d \qquad \text{[Equation 2]}$$

where h (r,r'; x) is an integral kernel in the case of d=2, 3.

Then, the inverse problem is formulated as an estimation problem of the unknown x from the measurement y. It is well known that inverse problems are ill-posed (the solution is not unique or the solution changes discontinuously with respect to conditions). A classical strategy to mitigate the ill-posedness is the penalized least squares (PLS) approach, which may be expressed as [Equation 3] below:

$$\hat{x} = \arg\min_x c(x; y) := \|y - \mathcal{H}x\|^q + R(x) \qquad \text{[Equation 3]}$$

where for $q \geq 1$, $R(x)$ is a regularization (or penalty) function ($l_p$, total variation (TV), etc.).

In some inverse problems, the measurement operator H is not well defined, so both the unknown operator H and the image x should be estimated.

Recently, deep learning approaches with supervised training have become the mainstream approaches for inverse problems because of their excellent and ultra-fast reconstruction performance. For example, in low-dose x-ray computed tomography (CT) denoising problems, a convolutional neural network (CNN) is trained to learn the relationship between the noisy image y and the matched noiseless (or high-dose) label images x. The supervised neural network may be understood as directly learning the operation $$\hat{x} = \arg\min_x c(x; y).$$

Unfortunately, in many applications, matched label data are not available. Therefore, unsupervised training without matched reference data has become an important research topic.

Recently, the generative adversarial network (GAN) has attracted significant attention in the machine learning community by providing a way to generate target data distribution from random distribution. In particular, the so-called Wasserstein GAN (W-GAN) is proposed, which is closely related to the mathematical theory of optimal transport (OT). In OT, for two given probability measures supported on the X and Y spaces, one pays a cost for transporting one measure to another. Then, the minimization of the average transportation cost provides an unsupervised way of learning the transport map between the two measures. Unfortunately, these GAN approaches often generate artificial features due to mode collapsing, so cycle-consistent GAN (cycleGAN), which imposes one-to-one correspondence, has been extensively investigated.

Although classical PLS, OT, and cycleGAN share the commonality of unsupervised learning which does not require matched training data, there is no mathematical theory to systematically link these seemingly different approaches.

SUMMARY

Embodiments of the inventive concept provide an unsupervised learning method to solve inverse problems by unsupervised learning and an apparatus therefor.

Embodiments of the inventive concept provide an unsupervised learning method and an apparatus therefor capable of learning unmatched data by deriving a structure in which a cycle consistency term is added to an existing structure by assuming a certain probability distribution without assumptions that measurement is fixed. The embodiments of the inventive concept provide an unsupervised learning method and an apparatus therefor capable of learning unmatched data by suggesting a cycle-consistent generative neural network and connection between an optimal transport theory and a penalized least square approach.

According to an exemplary embodiment, an unsupervised learning method applicable to inverse problems includes receiving a training data set, and training an unsupervised learning-based neural network generated based on an optimal transport theory and a penalized least square (PLS) approach using the training data set.

The receiving of the training data set may include receiving the training data set including unmatched data.

The neural network may include a first neural network that converts a first image obtained, as an input, from an intermittent Fourier spatial coefficient into a second image corresponding to a complete Fourier spatial coefficient; a Fourier transform unit that outputs a third image corresponding to the first image by applying a Fourier transform and an inverse Fourier transform to the second image; and a second neural network that discriminates between the second image and an actual image for the second image.

The neural network may be trained via unsupervised learning based on a cyclic loss between the first image and the third image and an adversarial loss between the second image and the actual image.

The neural network may include any one of a neural network based on a convolution framelet and a neural network including a pooling layer and an unpooling layer.

The neural network may include a first neural network that outputs a first deblurring image corresponding to the first microscopy image when the first microscopy image is input; a conversion unit that converts the first deblurring image into a second microscopy image corresponding to the first deblurring image using a point spread function; and a second neural network that discriminates between the first deblurring image and an actual image corresponding to the first deblurring image.

The conversion unit may include a linear convolution layer corresponding to the point spread function.

According to an exemplary embodiment, an image processing method includes receiving a first image, and reconstructing the first image as a second image corresponding to the first image using an unsupervised learning-based neural network generated based on an optimal transport theory and a penalized least square (PLS) approach.

An unsupervised learning apparatus applicable to inverse problems, includes a receiving unit that receives a training data set; a training unit that trains an unsupervised learning-based neural network generated based on an optimal transport theory and a penalized least square (PLS) approach using the training data set.

The receiving unit may receive the training data set including unmatched data.

The neural network may include a first neural network that converts a first image obtained from an intermittent Fourier spatial coefficient into a second image corresponding to a complete Fourier spatial coefficient as an input; a Fourier transform unit that outputs a third image corresponding to the first image by applying a Fourier transform and an inverse Fourier transform to the second image; and a second neural network that discriminates between the second image and an actual image for the second image.

The neural network may be trained via unsupervised learning based on a cyclic loss between the first image and the third image and an adversarial loss between the second image and the actual image.

The neural network may include any one of a neural network based on a convolution framelet and a neural network including a pooling layer and an unpooling layer.

The neural network may include a first neural network that outputs a first deblurring image corresponding to the first microscopy image when the first microscopy image is input; a conversion unit that converts the first deblurring image into a second microscopy image corresponding to the first deblurring image using a point spread function; and a second neural network that discriminates between the first deblurring image and an actual image corresponding to the first deblurring image.

The conversion unit may include a linear convolution layer corresponding to the point spread function.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
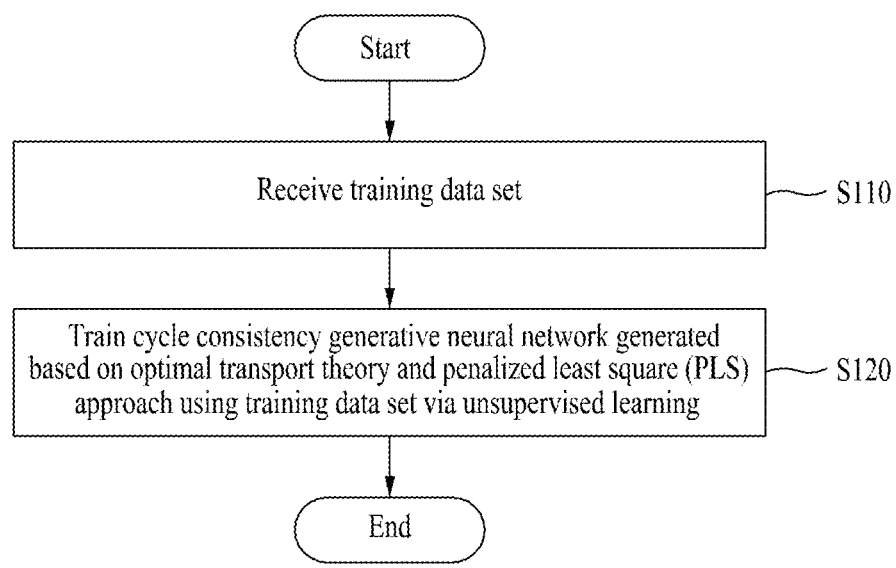
FIG. 1 shows a flowchart of an unsupervised learning method applicable to an inverse problem according to an embodiment of the inventive concept.
Figure 2:
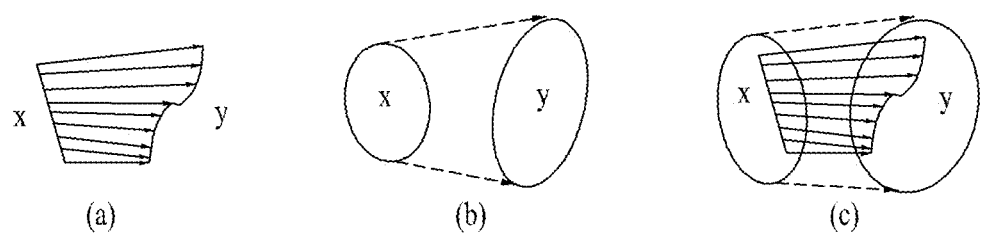
FIG. 2 shows an exemplary diagram for describing supervised learning and optimal transportation.

Advantages and features of the present invention and methods for achieving them will be apparent with reference to embodiments described below in detail in conjunction with the accompanying drawings. However, the inventive concept is not limited to the embodiments disclosed below, but may be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated features, integers, steps, operations, elements, parts or combinations thereof, but do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred embodiments of the present invention will be described in detail with reference to the accompanying drawings. The same reference numerals are used for the same components in the drawings, and duplicate descriptions of the same components are omitted.

Embodiments of the inventive concept generalize that input training data sets may be a random variable rather than a fixed one to derive a cycleGAN structure that may be applied to unsupervised learning. In particular, in WGAN (generative neural network that makes the probability distribution of the generated data similar to the probability distribution of target data by using optimal transport), a new equation is developed by adding a deep learning regularization term to the transport cost to derive a cycle consistency term. In other words, the cycleGAN, which mitigates mode collapsing by making a one-to-one correspondence, may be seen as a stochastic generalization of PLS. Moreover, since such a mathematical proof is a proof in a general situation, changing the PLS term becomes a way to solve a general inverse problem.

The inventive concept will be described in detail below.

FIG. 1 shows a flowchart of an unsupervised learning method applicable to an inverse problem according to an embodiment of the inventive concept.

Referring to FIG. 1, a method according to an embodiment of the inventive concept includes receiving a preset training data set (S110) and training an unsupervised learning-based neural network generated based on the optimal transport theory and the penalized least squares (PLS) approach using the training data set (S120).

In step S110, since the unsupervised learning-based neural network may learn unmatched data based on the optimal transport theory and the penalized least squares (PLS) approach, the training data set including the unmatched data may be received.

In the inventive concept, the neural network may include a cycle consistency generative neural network, and may include one generator and one discriminator.

In this case, the generator converts an image obtained from an intermittent Fourier space coefficient into an image corresponding to a complete Fourier space coefficient, and the discriminator discriminates between the image created by the generator and an actual image.

In the inventive concept, the first neural network for the generator and the second neural network for the discriminator may be trained via unsupervised learning based on predefined cyclic loss and adversarial loss.

In this case, the neural network in the inventive concept may further include a Fourier transform unit for applying Fourier transform and inverse Fourier transform in the case of accelerated MRI, and in the case of a deconvolution microscopy image, may further include a conversion unit for converting a deblurring image corresponding to the microscopy image into the microscopy image using a point spread function.

Furthermore, the inventive concept may reconstruct an input image for example, an accelerated MRI image or a microscopy image, into a high-resolution image corresponding to the input image by using the trained unsupervised learning-based neural network.

The method of the inventive concept will be described with reference to FIGS. 2 to 6 as follows.

Optimal Transport (OT)

OT compares two measures in a Lagrangian framework. Formally, it may be said that $T: X \to Y$ transports $\mu \in P(x)$ to $v \in P(Y)$, as if the following [Equation 4] is given.

$$v(B) = \mu(T^{-1}(B)), \text{for all measurable set } B. \quad \text{[Equation 4]}$$

where the condition is often simply represented by $v = T \# \mu$, and $T \#$ is often called the push-forward operator. Monge's original OT problem is then to find a transport map T that transports $\mu$ to $v$ at the minimum total transportation cost as in the following [Equation 5]:

$$\min_{T} \mathbb{M}(T) := \int_{x} c(x, T(x)) d\mu(x) \quad \text{[Equation 5]}$$

subject to $v = T_{\#}\mu$

However, this is usually computationally expensive due to the nature of combinatorial assignment. Kantorovich relaxed the assumption to consider probabilistic transport that allows mass splitting from a source toward several targets. Specifically, Kantorovich introduced a joint measure $\pi \in P(X \times Y)$ and the associated cost $c(x,y)$, $x \in X$, and $y \in Y$. $d\pi(x,y)$ is the amount of mass transferred from x to y, and $c(x,y) d\pi(x,y)$ is the associated cost. Thereafter, Kantorovich's relaxation is formulated as in [Equation 6] below for all measurable sets $A \in X$ and $B \in Y$.

$$\min_{\pi} \mathbb{K}(\pi) := \int_{x \times y} c(x, y) d\pi(x, y) \quad \text{[Equation 6]}$$

subject to $\pi(A \times y) = \mu(A), \pi(X \times B) = v(B)$

Here, the last two constraints come from the observation that the total amount of mass removed from any measurable set has to equal the marginals. Another important advantage of Kantorovich formulation is the dual formulation as stated in the following theorem.

Theorem 1 (Kantorovich duality theorem): When $(X, \mu)$ and $(Y, v)$ are given as two Polish probability spaces (separable complete metric space) and $c: X \times Y \to R$ is given as a continuous cost function, such that $|c(x,y)| \leq cx(x) + cy(y)$ for some $cx \in L^1(\mu)$ and $cy \in L^1(v)$. $L^1(\mu)$ denotes the set of 1-Lipschitz functions with the measure $\mu$. Then, there is duality as the following Equation:

$$\min_{\pi\Pi(\mu,v)} \int_{x \times y} c(x, y) d\pi(x, y) = \max_{\varphi \in L^1(\mu)} \left\{ \int_{x} \varphi(x) d\mu(x) + \int_{y} \varphi^c(y) dv(y) \right\}$$

The above maximum is taken over the so-called Kantorovich potential $\varphi$ whose c-transform $\varphi^c(y) = \sup_x (c(x,y) - \varphi(x))$ is properly defined.

Penalized Least Square with Deep Learning Prior

Recently, the penalized least squares (PLS) approaches using a prior distribution based on deep learning has been extensively studied. The main idea of these approaches is to utilize a pre-trained neural network to stabilize a solution of the inverse problem. For example, in a model based deep learning architecture (MoDL), [Equation 7] is minimized. Since it is similar to the classical normalization theory, a model-based image reconstruction framework using a convolutional neural network (CNN) based on previous extension studies has been extensively studied. The main idea is to stabilize the inverse solution by utilizing a pre-trained neural network. In particular, in the case of $p \geq 1$, this problem may be formulated as shown in [Equation 7] below.

$$\min_{x} c(x; y, \Theta, \mathcal{H}) = \|y - Hx\|^2 + \lambda \|x - Q_{\Theta}(x)\|^2 \quad \text{[Equation 7]}$$

where $Q_{\Theta}$ is a pre-trained CNN with the network parameter $\Theta$ and the input x. As described above, using a pre-trained convolutional neural network (CNN) that removes noise, a high penalty is given to the artificial structure of the solution found by the network. That is, the minimization problem of [Equation 7] is to find a balance between the data fidelity term and the CNN output.

Main Contributions

One of the basic assumptions in the aforementioned PLS formulation with a deep learning prior is that the measurement y is fixed and one is interested in finding the unknown x. The inventive concept relaxes the assumption of classical PLS finding one x for one y and considers a combined probability distribution that considers all combinations of x and y.

Specifically, training needs to be performed such that a physical measurement operator H satisfies $H \# \mu = v$ and the generator satisfies $G\Theta\#v = \mu$, when ignoring the error $\omega$ for two measure spaces $(X, \mu)$ and $(Y, v)$. This corresponds to minimizing the cost as shown in [Equation 8] below.

$$c(x,y;\Theta,H) = \|y - Hx\|^q + \|G_{\Theta}(y) - x\|^p \quad \text{[Equation 8]}$$

Unlike Equation 7, the network $G_{\Theta}(y)$ of Equation 8 is not pre-trained and needs to be learned through a training process. Specifically, $\Theta$ and H may be network and measurement system parameters to be estimated. These parameters may be found by minimizing the average transport cost for all combinations of $x \in X$ and $y \in Y$ with respect to the joint measure $(x, y)$, and may be expressed as Equation 9 below.

$$\mathbb{T}(\Theta, \mathcal{H}) = \min_{\pi} \int_{X \times Y} c(x, y; \Theta, H) d\pi(x, y) \qquad [\text{Equation 9}]$$

Here, the minimum is taken over all joint distributions whose the marginal distribution with respect to X and Y is $\mu$ and $\nu$, respectively.

Hereinafter, it is shown that the average transportation cost in Equation 9 has an interesting decomposition.

Lemma 1: When the mapping $G_\Theta: Y \rightarrow X$ is a single-valued, the average transportation cost $T(\Theta, H)$ in Equation 9 may be decomposed as shown in Equation 10 to Equation 12 below.

$$\mathbb{T}(\Theta, H) = l_{cycle}(\Theta, H) + l_{OT'}(\Theta, H) \qquad [\text{Equation 10}]$$

$$l_{cycle}\left(\Theta, H = \min_{\pi} \int_{A \cup B} c(x, y; \Theta, H) d\pi(x, y)\right) \qquad [\text{Equation 11}]$$

$$l_{OT'}(\Theta, H) = \min_{\pi} \int_{X \times Y \setminus A \cup B} c(x, y; \Theta, H) d\pi(x, y) \text{ where } A = \qquad [\text{Equation 12}]$$

$$\{(x, y) \in X \times 1 \mid x = G_\Theta(y), y \in Y\} \text{ and } B =$$

$$\{(x, y) \in X \times Y \mid y = Hx, x \in X\}.$$

Proof: from the definition of $l_{cycle}$ and $l_{OT}$, it may be simply shown as the following equation.

$$T(\Theta) \geq l_{cycle}(\Theta, H) + l_{OT'}(\Theta, H)$$

To show reversed inequality, we need the classical results on optimal transport for the restricted measure (Villani, 2008, Theorem 4.6, p.46). Specifically, Theorem 2 informs that for some optimal transportation plan $\pi^*$, the restrictions $\pi^*|_{A \cup B}$ and $\pi^*|_{X \times Y \setminus A \cup B}$ acquire optimality. Therefore, the average transportation cost may be proved by the following equation.

$$\mathbb{T}(\Theta, H) = \int_{X \times Y} c(x, y; \Theta, H) d\pi^*(x, y)$$

$$= \int_{A \cup B} c(x, y; \Theta, H) d\pi^*(x, y) +$$

$$\int_{X \times Y \setminus A \cup B} c(x, y; \Theta, H) d\pi^*(x, y)$$

$$= l_{cycle}(\Theta, H) + l_{OT'}(\Theta, H)$$

The next proposition tells why the first term is named as $l_{cycle}$. In deed, the term $l_{cycle}(\Theta, H)$ in Equation 11 is a weighted version of the cycle consistency (or cycle coherence) term in cycleGAN, which imposes a constraint $x \equiv G_\Theta(Hx)_1 \forall \forall \in x$ and $y \equiv HG_\Theta(y), \forall y \in Y$. However, the formulation in the inventive concept is more general. The reason for this is that there exists weighting factors that may balance the importance of the cycle-consistency terms.

Proposition 1

In [Equation 9], $p=q=1$ is considered.

$$\mathbb{K}(\Theta, H) = \min_{\pi} \int_{X \times Y} \|y - Hx\| + \|G_\theta(y) - x\| d\pi(x, y)$$

In this case, D defined as in the following Equation is considered.

$$l_{cycle}(\Theta, H) = \frac{1}{2} \left\{ \int_X \|x - G_\Theta(Hx)\| d\mu(x) + \int_Y \|y - HG_\Theta(y)\| d\nu(y) \right\}$$

$$l_{OT'}\left(\Theta, H = \frac{1}{2} \left\{ \max_\varphi \int_X \varphi(x) d\mu(x) - \int_Y \varphi(G_\Theta(y)) d\nu(y) + \max_\psi \int_Y \psi(yh) d\nu(y) - \int_Y \psi(Hx) d\mu(x) \right\} \right.$$

The average transportation cost K may approximate to D within an error as shown in the following equation.

$$|\mathbb{K}(\Theta, H) - \mathbb{D}(\Theta, H)| \leq \frac{1}{2} l_{cycle}(\Theta, H)$$

The error becomes zero when $G\Theta$ is the inverse function of H.

A. Proof.

First, considering the optimal joint measure $\pi^*$ by Theorem 1, it may be as shown in the following equation.

$$\mathbb{K}(\Theta, H) = \min_{\pi} \int_{X \times Y} e(x, y; \Theta, H) \pi(dx, dy) = \int_{X \times Y} e(x, y; \Theta, H) \pi^*(dx, dy)$$

When Kantorovich duality theorem is applied to this equation, the following equation may be obtained.

$$\mathbb{K}(\Theta, H) = \int_{X \times Y} \|y - Hx\| + \|\log(y) - x\| d\pi^*(x, y)$$

$$= \frac{1}{2} \left\{ \begin{array}{l} \max_\varphi \int_X \varphi(x) d\mu(x) + \int_Y \varphi(y^c) d\nu(y) + \\ \max_\psi \int_X \psi^c(x) d\mu(x) + \int_Y \psi(y) d\nu(y) \end{array} \right\}$$

$$= \frac{1}{2} \left\{ \max_\varphi \int_X \varphi(x) d\mu(x) + \int_Y \inf\{\|y - Hx\| + \|G_\theta(y) - x\| - \varphi(x)\} \right.$$

$$d\nu(y) + \max_\varphi \int_X \inf_y \{\|y - 1 - k\| + \|G_\theta(y) - x\| - \psi(y)\}$$

$$\left. d\mu(x) + \int_Y \psi(y) d\nu(y) \right\}$$

Here, the problem of obtaining the optimal joint measure turns into a problem of obtaining the Kantorovich potentials $\varphi$ and $\psi$. Now, by being substituted with $x = G\Theta(y)$ instead of finding the lower limit for x, and being substituted with $y = Hx$ instead of replacing the lower limit for y, it is possible to obtain the upper limit as shown in the equation below.

$$\mathbb{K}(\Theta, H) \leq$$

$$\frac{1}{2} \left\{ \left( \max_\varphi \int_X \varphi(x) d\mu(x) - \int_Y \varphi(G_\Theta(\eta)) d\nu(y) + \int_Y \|y - HG_\Theta(y)\| d\nu(y) + \right.\right.$$

$$\max_\psi \int_Y \psi(y) d\nu(y) - \int_X \psi(Hx) d\mu(x) + \int_X \|G_\Theta(Hx) - x\| d\mu(x) = \frac{1}{2}$$

$$\left\{ \max_\varphi \int_X \varphi(x) d\mu(x) - \int_Y \varphi(G_\Theta(y)) d\nu(y) + \max_\psi \int_Y \psi(y) d\nu(y) - \int_X^\psi (Hx) d\mu(x) + \right.$$

$$\left. \int_X \|G_\Theta(Hx) - x\| d\mu(x) + \int_Y \|y - HG_\Theta(y)\| d\nu(y) \right\} = l_{OT'}(\Theta, H) + l_{cycle}(\Theta, H)$$

On the other hand, the following two inequalities obtained by the Kantorovich potential's Lipschitz continuity may be used, and $$-\varphi(G_\Theta(y)) \leq \|G_\Theta(y) - x\| - \varphi(x) \leq \|y - hx\| + \|G_\Theta(y) - x\| - \varphi(x)$$

$$-\psi(hx) \leq \|y - hx\| - \psi(y) \leq \|y - hx\| + \|G_\Theta(y) - x\| - \psi(x)$$

when using the above two inequalities, it is possible to obtain the lower limit as shown in the following equation.

$$\mathbb{K}(\Theta, H) \geq \frac{1}{2}\left\{\max_\varphi \int_X \varphi(x)d\mu(x) - \int_Y \varphi(G_\Theta(y))dv(y) + \max_\psi \int_Y \psi(yh)dv(y) - \int_X \psi(Hx)d\mu(x)\right\}$$

By these two boundaries $l_{OT'}(\Theta,H) \leq K(\Theta,H) \leq l_{OT'}(\Theta,H) + l_{cycle}(\Theta,H)$, an approximate equation such as the following equation may be derived.

$$|\mathbb{K}(\Theta, H) - \mathbb{D}(\Theta, H)| \leq \frac{1}{2}l_{cycle}(\Theta, H)$$

Finally, an approximation error becomes zero when $l_{cycle}$ becomes zero. Since $HG\Theta(y)=y$ and $G\Theta Hx=x$ are established for all x and y, in other words, $G\Theta$ and $H$ become inverse functions with respect to each other.
End of Proof.

The optimal transport function may be obtained by minimizing the average transportation cost as shown in the following equation.

$$\min_{\Theta,H}\mathbb{K}(\Theta, H)$$

According to Proposition 1, the above problem may be solved as an optimization problem under constraints. Considering a sufficiently small tolerance $l_{cycle}$ of ε, it may be expressed as the following equation.

$$\min_{\Theta,H}\mathbb{D}(\Theta, H) \text{ subject to } l_{cycle}(\Theta, H) \leq \epsilon$$

Also, this problem may be solved with an unrestricted Lagrangian duality problem. For the Lagrangian variable a that changes according to ε, it may be expressed as the following equation.

$$\inf_{\Theta,H} L(\Theta, H, \alpha) := \mathbb{D}(\Theta, H) + \alpha(l_{cycle}(\Theta, H) - \epsilon)$$

Therefore, the constraint optimization problem becomes an optimization problem without simple constraints such as the following equation.

$$\min_{\Theta,H}\mathbb{D}(\Theta, H) + \alpha l_{cycle}(\Theta, H) \text{ or}$$

$$\min_{\Theta,H}\ell_{OT'}(\Theta, H) + \gamma l_{cycle}(\Theta, H)$$

The final step is to implement the Kantorovich potential using a deep neural network with Φ and Ξ as parameters. In this case, the cycleGAN problem may be expressed as the following equation.

$$\min_{\Theta,H}\mathbb{D}(\Theta, H) + \alpha l_{cycle}(\Theta, H) \text{ or } \min_{\Theta,H} l_{OT'}(\Theta, H) + l_{cycle}(\Theta, H)$$

The total loss consists of $l_{OTDisc}$ and $l_{cycle}$ defined above, and may be expressed as the following equation.

$$l(\Theta,H;\phi,\Xi)=l_{OTDisc}(\Theta,H;\phi,\Xi)+\gamma l_{cycle}(\Theta,H)$$

$l_{OTDisc}$ is the GAN loss (or hostile loss) using the Kantorovich potential $$l_{OTDisc}(\Theta, h; \Phi, \Xi) = \frac{1}{2}\left\{\int_X \varphi_\Phi(x)d\mu(x) - \int_Y \varphi_\Phi(G_\Theta(y))dv(y) + \int_Y \psi_\Xi(y)dv(y) - \int_X \psi_\Xi(hx)d\mu(x)\right\}$$

It should be noted that the derivation formulation is more general compared to the standard cycleGAN because a general form of measurement data generator Hx may be used. Hereinafter, a method of selecting H according to a specific use will be described.
Accelerated MRI CycleGAN may be applied to solve various inverse problems, for example, there is a magnetic resonance image (MRI) restoration problem. Magnetic resonance imaging is a method of visualizing an image by obtaining a Fourier space (k-space) coefficient and transforming it into an image space coefficient by applying an inverse Fourier transform. However, it takes a long time to obtain the Fourier space coefficient, which causes distortion in the Fourier space coefficient due to the subject's motion. To solve this problem, the accelerated MRI method uses a method of intermittently acquiring Fourier spatial coefficients to reduce the time required for image acquisition, and then filling the Fourier spatial coefficients that were not acquired through an additional restoration process. Previously, compressed sensing was mainly used to restore Fourier space coefficients. However, in recent years, when using a deep learning-based restoration method, it has been widely used in solving this problem because it provides good performance and reduces restoration time. These are methods of restoring a Fourier spatial coefficient that may not be obtained by referring to a fully acquired Fourier spatial coefficient based on supervised learning based on the existing deep learning-based restoration methods. However, since it takes a long time to obtain a complete Fourier spatial coefficient, it is difficult to obtain a matched reference image, and thus the need for unsupervised learning that does not require the matched reference image is increasing.

In accelerated MRI, the forward measurement model may be described as in [Equation 13]:

$$\hat{x}=P_\Omega Fx+w \quad\quad\quad \text{[Equation 13]}$$

where F is the 2-D Fourier transform and PΩ is the projection to Ω that denotes k-space sampling indices and means an operation that multiplies the sampling mask Ω to make the complete Fourier space coefficient intermittently. To implement every step of the algorithm as image domain processing, [Equation 13] may be converted to the image domain forward model by applying the inverse Fourier transform, which is expressed as [Equation 14] below:

$$y = \mathcal{F}^{-1}\mathcal{P}_\Omega \mathcal{F} x + \mathcal{F}^{-1} w \qquad \text{[Equation 14]}$$

This results in the following cost function for the PLS formulation as in [Equation 15]:

$$c(x,y;\Theta)=\|y-F^{-1}P_\Omega Fx\|+\|G_\Theta(y)-x\| \qquad \text{[Equation 15]}$$

In general, since the sampling mask Ω is already known, the forward mapping function has already been determined in the inverse problem.

Figure 3:
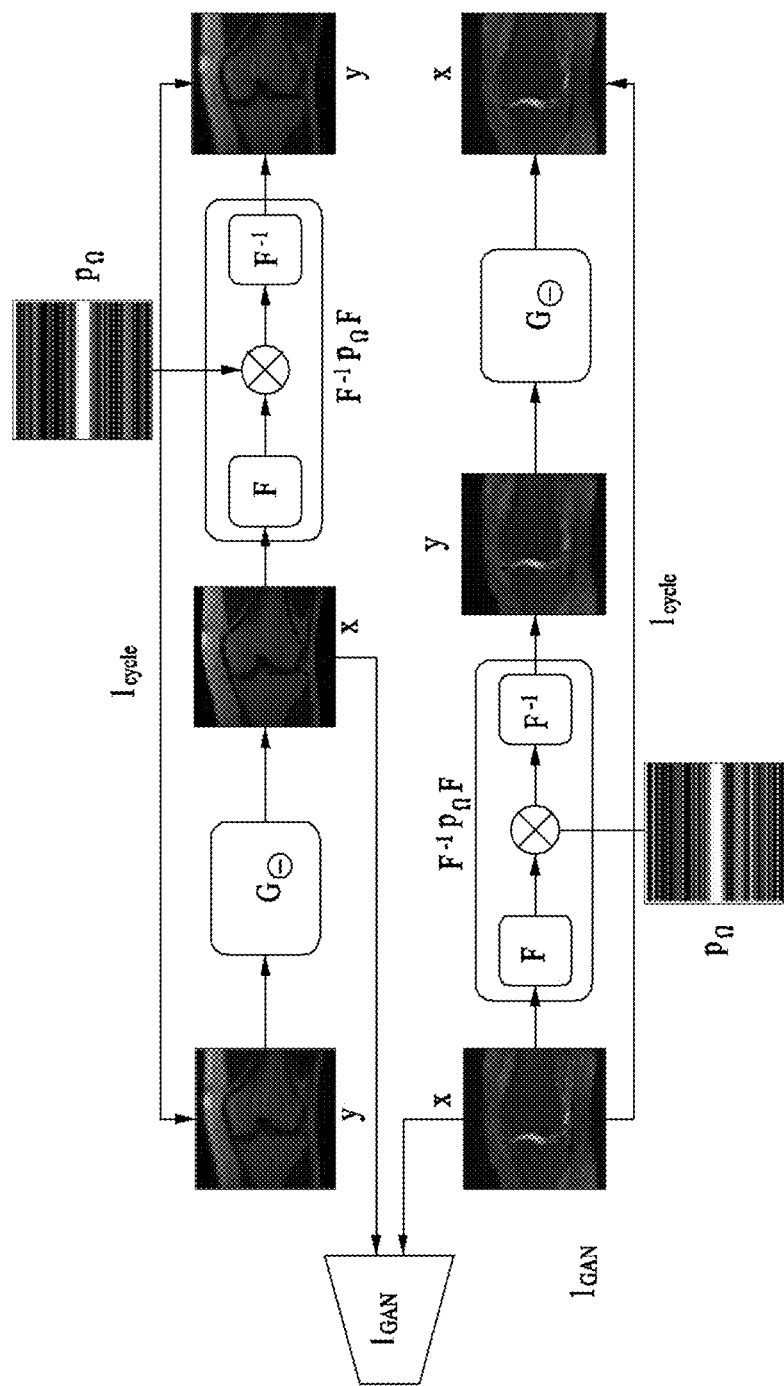
FIG. 3 shows a cycleGAN structure for MRI reconstruction according to an embodiment of the inventive concept.

FIG. 3 shows a cycleGAN structure for MRI restoration according to an embodiment of the inventive concept. As shown in FIG. 3, the cycleGAN architecture includes one generator and one discriminator.

The generator converts an image obtained from an intermittent Fourier space coefficient into an image corresponding to a complete Fourier space coefficient, and the discriminator discriminates between the image created by the generator and an actual image.

A single generator is needed as the mapping from the clean to aliased images is deterministic for a given sampling pattern. As for the loss function, the α=0 and γ=0.5 are used in the objective function for the above optimization problem. For GAN implementation, the inventive concept uses the Wasserstein GAN (W-GAN) with the Lipschitz penalty loss to ensure that the Kantorovich potential becomes 1-Lipschitz.

That is, as shown in FIG. 3, the neural network according to an embodiment of the inventive concept includes a generator that converts a first image obtained from an intermittent Fourier spatial coefficient into a second image corresponding to a complete Fourier spatial coefficient as an input, a Fourier transform unit that outputs a third image corresponding to the first image by applying a Fourier transform and an inverse Fourier transform to the second image, and a discriminator that discriminates between the second image and an actual image for the second image, wherein the neural network may be trained via unsupervised learning based on a cyclic loss between the first image and the third image and an adversarial loss between the second image and the actual image. Of course, the generator and the discriminator may learn the neural network by being simultaneously trained via unsupervised learning based on a cyclic loss and an adversarial loss.

For the generator's network architecture, the inventive concept may use a 3D-Unet structure or a 2D-Unet structure. The 3D-Unet structure for the generator consists of contracting and expanding paths. The contracting path consists of the repetition of 3D convolution layers-Instance Normalization layers-ReLU (rectified linear unit) layer blocks. Here, the 3D convolution layer may perform a 3D linear transform operation, the instance normalization layer may perform a normalization operation, and the ReLU layer may perform a nonlinear function operation. In addition, the U-Net may include a pooling layer and an unpooling layer, and may include a skipped connection (or bypass connection) between an encoder and a decoder. Here, the skipped connection may compensate for high frequencies lost during pooling.

The network architecture of the discriminator may be composed of modules consisting of a 3D (or 2D) convolution layer (Conv), an instance normalization layer (Instance Norm), and a ReLU layer. Each convolution layer has a stride 2 or stride 1 to downsample an input volume, and the number of output channels in the last layer is 1.

The neural network of the inventive concept is not limited to the above-described network structure, and may include a neural network based on a convolution framelet and a neural network including a pooling layer and an unpooling layer.

Figure 4:
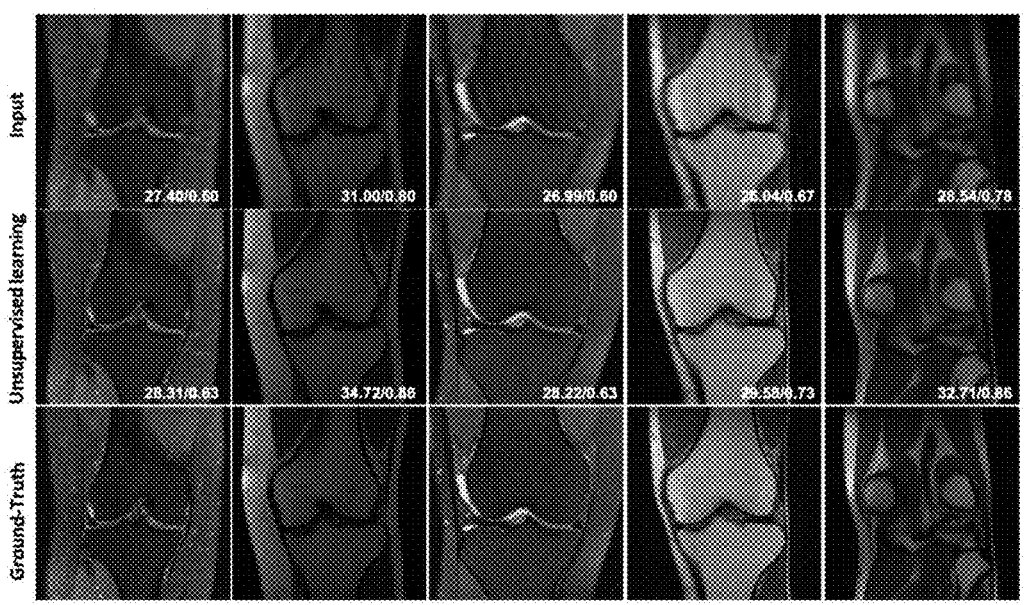
FIG. 4 shows an exemplary view of unsupervised learning results for accelerated MRI using the cycleGAN of the inventive concept.

FIG. 4 is an exemplary diagram showing an unsupervised learning result for an accelerated MRI using the cycleGAN of the inventive concept. It may be seen from FIG. 4, that the method of the inventive concept may achieve reconstruction of a detailed structure without matched data.

Deconvolution Microscopy

Deconvolution microscopy is extensively used to improve the resolution of widefield fluorescent microscopy. Recently, CNN approaches have been extensively studied as fast and high-performance alternatives. Unfortunately, the CNN approaches usually require matched high-resolution images for supervised training. Mathematically, a blurred measurement (or blurred microscopy image) may be described as in [Equation 16] below:

$$y=h*x+w \qquad \text{[Equation 16]}$$

where h may denote the point spread function (PSF). When the PSF h, commonly called blind deconvolution problem, is unknown, it is necessary to estimate both the unknown PSF h and the image x. This results in the following cost function for the PLS as in [Equation 17]:

$$c(x,y;\Theta,h)=\|y-h*x\|+\|G_\Theta(y)-x\| \qquad \text{[Equation 17]}$$

Figure 5:
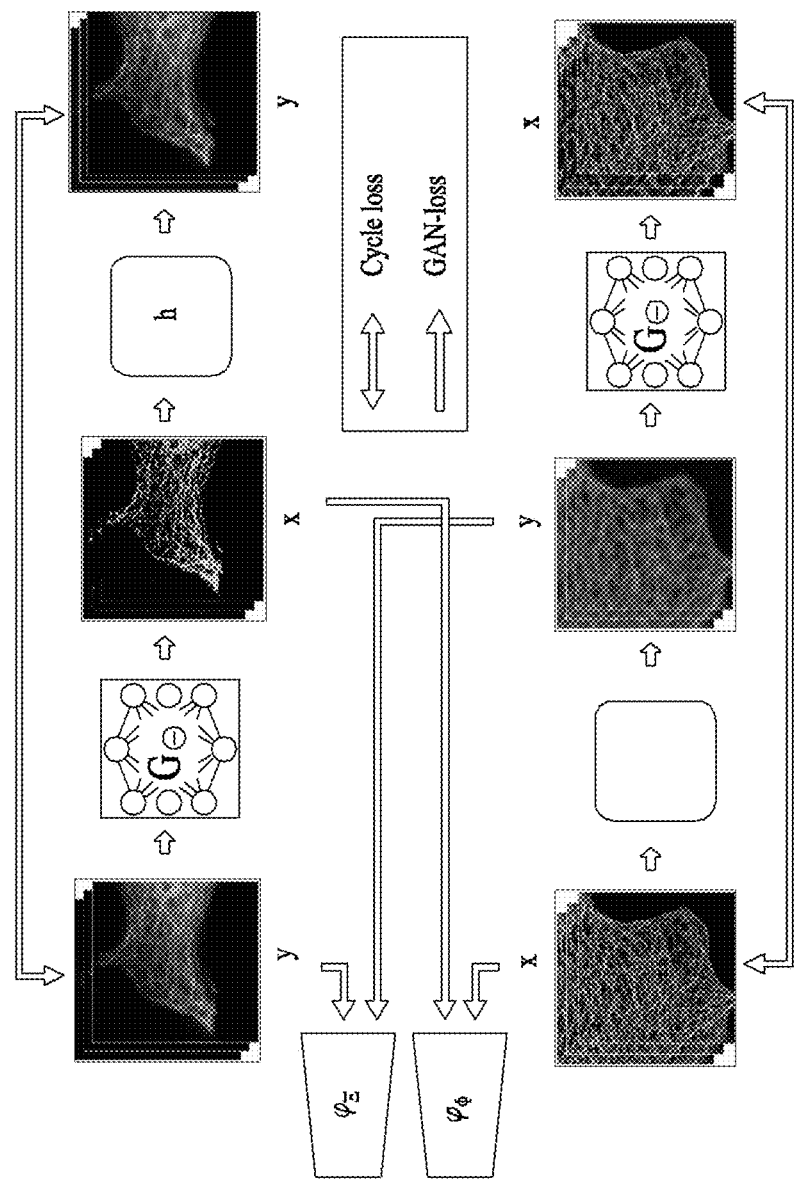
FIG. 5 shows a cycleGAN structure having a blur kernel for deconvolutional microscopy.

FIG. 5 shows a cycleGAN structure with a blur kernel for deconvolution microscopy. As shown in FIG. 5, in contrast to the conventional cycleGAN approaches that require two generators, the cycleGAN approach of the inventive concept needs only a single generator, and a blur image generator may be replaced with a linear convolutional layer corresponding to the PSF, which significantly improves the robustness of network training.

That is, as shown in FIG. 5, the neural network according to another embodiment of the inventive concept includes a generator that outputs a first deblurring image corresponding to a first microscopy image when the first microscopy image is inputted, a conversion unit that converts the first deblurring image into a second microscopy image corresponding to the first microscopy image using a point spread function, and a discriminator that discriminates between the first deblurring image and an actual image (or actual microscopy image) for the first deblurring image, wherein the neural network may be trained via unsupervised learning based on a cyclic loss between the first microscopy image and the second microscopy image and an adversarial loss between the first deblurring image image and the actual image. Of course, the generator and the discriminator may learn the neural network by being simultaneously trained via unsupervised learning based on a cyclic loss and an adversarial loss. Here, the transform unit may include a linear convolution layer corresponding to the point spread function.

Figure 6:
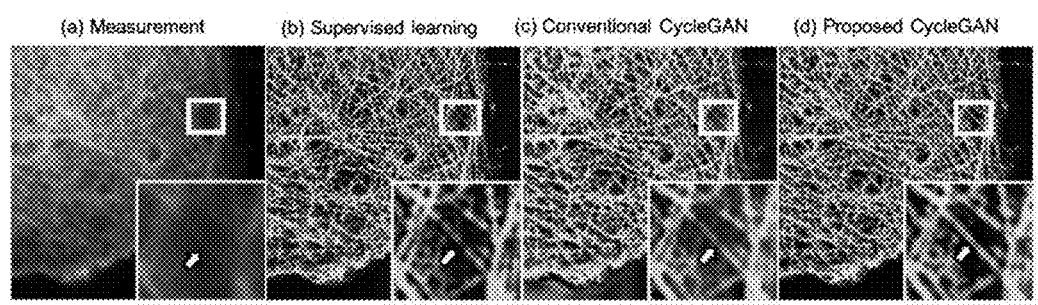
FIG. 6 shows lateral views of deconvolution results of microtube samples by various methods.

FIG. 6 shows lateral views of deconvolution results of microtube samples by various methods. Here, input images are degraded by blur and noise.

As shown in FIG. 6, the supervised learning and the standard cycleGAN with two generators have showed better contrast and removed blur; however, the structural continuity was not preserved. On the other hand, in the cycleGAN approach of the inventive concept, blurs and noise were successfully removed and preserved the continuity of the structure.

The method according to the embodiments of the inventive concept may learn unmatched data by deriving a structure in which a cycle consistency term is added to an existing structure by assuming a certain probability distribution without assumptions that measurement is fixed, specifically, by suggesting a cycle-consistent generative neural network and joint between an optimal transport theory and a penalized least square approach.

Since a probability distribution that does not require matching of a measured value and a true value and takes into account all matching cases is learned, the method according to the embodiments of the inventive concept may be applied not only for unmatched data but also for a general function, so that, when mapping in one direction complies with laws of physics, more efficient and accurate learning is possible by applying mapping that satisfies those laws.

The method according to the embodiments of the inventive concept may be applied to various inverse problem solving, and may be applied even when there is no matched data. In particular, the inventive concept may be used in various medical imaging techniques to shorten time or reduce the amount of exposure of a patient. For example, the inventive concept may be used when there is no complete data of the image by intermittently obtaining information to shorten time from a magnetic resonance image. When the inventive concept is used, it is possible to reconstruct unacquired data even when only unmatched data is present.

The method according to the embodiments of the inventive concept may be used for deconvolution of a microscopy image. That is, the inventive concept may be applied without limitation because the inventive concept is based on unsupervised learning even though the point spread function of the microscopy is not known and there is no matched high-definition image, and in addition, the inventive concept may be applied to various image processing fields.

Figure 7:
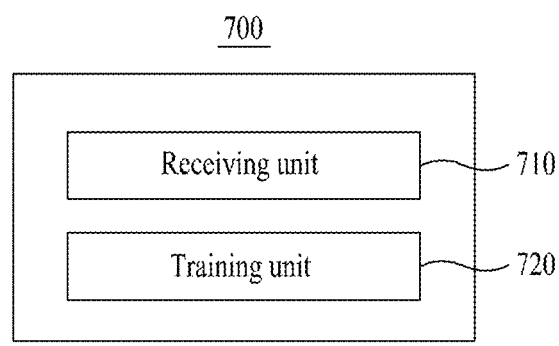
FIG. 7 shows a configuration of an unsupervised learning apparatus applicable to an inverse problem according to an embodiment of the inventive concept.

FIG. 7 is a diagram showing a configuration of an unsupervised learning apparatus applicable to an inverse problem according to an embodiment of the inventive concept, and illustrates a conceptual configuration of an apparatus for performing the method of FIGS. 1 to 6.

Referring to FIG. 7, an apparatus 700 according to an embodiment of the inventive concept includes a receiving unit 710 and a training unit 720.

The receiving unit 710 receives a training data set.

In this case, the receiving unit 710 may receive the training data set including unmatched data.

The training unit 720 trains an unsupervised learning-based neural network generated based on an optimal transport theory and a penalized least square (PLS) approach using the training data set.

In this case, the neural network includes: a first neural network that converts a first image obtained from an intermittent Fourier spatial coefficient into a second image corresponding to a complete Fourier spatial coefficient as an input; a Fourier transform unit that outputs a third image corresponding to the first image by applying a Fourier transform and an inverse Fourier transform to the second image; and a second neural network that discriminates between the second image and an actual image for the second image.

In this case, the neural network may be trained via unsupervised learning based on a cyclic loss between the first image and the third image and an adversarial loss between the second image and the actual image.

The neural network may include any one of a neural network based on a convolution framelet and a neural network including a pooling layer and an unpooling layer.

In this case, the neural network includes: a first neural network that outputs a first deblurring image corresponding to the first microscopy image when the first microscopy image is input; a conversion unit that converts the first deblurring image into a second microscopy image corresponding to the first deblurring image using a point spread function; and a second neural network that discriminates between the first deblurring image and an actual image corresponding to the first deblurring image.

In this case, the conversion unit may include a linear convolution layer corresponding to the point spread function.

Although the description is omitted with reference to the apparatus of FIG. 7, components constituting FIG. 7 may include all the contents described with reference to FIGS. 1 to 6, which are obvious to those skilled in the art.

The apparatus described herein may be implemented with hardware components and software components and/or a combination of the hardware components and the software components. For example, the apparatus and components described in the embodiments may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such a parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that may be executed by various computer means and recorded on a computer-readable medium. The computer readable medium may include program instructions, data files, data structures, and the like, alone or in combination. Program instructions recorded on the media may be those specially designed and constructed for the purposes of the present invention, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that may be executed by a computer using an interpreter or the like.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be coupled or combined in a different form than the described method, or other components, or even when replaced or substituted by equivalents, an appropriate result may be achieved.

Therefore, other implementations, other embodiments, and equivalents to the claims are within the scope of the following claims.

According to the embodiments of the inventive concept, it is possible to learn unmatched data by deriving a structure in which a cycle consistency term is added to an existing structure by assuming a certain probability distribution without assumptions that measurement is fixed, specifically, by suggesting a cycle-consistent generative neural network and connection between an optimal transport theory and a penalized least square approach.

Since a probability distribution that does not require matching of a measured value and a true value and takes into account all matching cases is learned, the embodiments of the inventive concept may be applied not only for unmatched data but also for a general function, so that, when mapping in one direction complies with laws of physics, more efficient and accurate learning is possible by applying mapping that satisfies those laws.

The embodiments of the inventive concept may be applied to various inverse problem solving, and may be applied even when there is no matched data. In particular, the inventive concept may be used in various medical imaging techniques to shorten time or reduce the amount of exposure of a patient. For example, the inventive concept may be used when there is no complete data of the image by intermittently obtaining information to shorten time from a magnetic resonance image. When the inventive concept is used, it is possible to reconstruct unacquired data even when only unmatched data is present.

The embodiments of the inventive concept may be used for deconvolution of a microscopy image. That is, the inventive concept may be applied without limitation because the inventive concept is based on unsupervised learning even though the point spread function of the microscopy is not known and there is no matched high-definition image, and in addition, the inventive concept may be applied to various image processing fields.

The embodiments of the inventive concept may be applied not only to general image processing-related inverse problems such as improvement of image quality of low-quality images and image noise removal, but also to special fields such as medical imaging.

According to the embodiments of the inventive concept, there is provided a method applicable to a general inverse problem, so that one-way generative neural networks and adversarial neural networks may be replaced with a function satisfying the physical laws in the field where basic physical laws such as the point spread function or the Fourier transform are established, thus reducing computational cost and time.

Since the inventive concept relates to a general-purpose inverse problem solving technique, the inventive concept may be applied to various fields such as image quality improvement for smartphones and cameras, noise removal, and deep learning-based algorithms for medical imaging devices.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An unsupervised learning method applicable to inverse problems, comprising:
   receiving a training data set; and
   training an unsupervised learning-based neural network generated based on an optimal transport theory and a penalized least square (PLS) approach using the training data set, wherein the neural network includes:
   a first neural network configured to convert a first magnetic resonance image (MRI) obtained, as an input, from an intermittent Fourier spatial coefficient into a second MRI corresponding to a complete Fourier spatial coefficient;
   a Fourier transform unit configured to output a third MRI corresponding to the first MRI by applying a Fourier transform and an inverse Fourier transform to the second MRI; and
   a second neural network configured to discriminate between the second MRI and an actual MRI for the second MRI.

2. The unsupervised learning method of claim 1, wherein the receiving of the training data set includes receiving the training data set including unmatched data.

3. The unsupervised learning method of claim 1, wherein the neural network is trained via unsupervised learning based on a cyclic loss between the first image and the third image and an adversarial loss between the second image and the actual image.

4. The unsupervised learning method of claim 1, wherein the neural network includes any one of a neural network based on a convolution framelet and a neural network including a pooling layer and an unpooling layer.

5. An image processing method, comprising:
   receiving a first image; and
   reconstructing the first image as a second image corresponding to the first image using an unsupervised learning-based neural network generated based on an optimal transport theory and a penalized least square (PLS) approach, wherein the neural network includes:
   a first neural network configured to convert a first magnetic resonance image (MRI) obtained, as an input, from an intermittent Fourier spatial coefficient into a second MRI corresponding to a complete Fourier spatial coefficient;
   a Fourier transform unit configured to output a third MRI corresponding to the first MRI by applying a Fourier transform and an inverse Fourier transform to the second MRI; and
   a second neural network configured to discriminate between the second MRI and an actual MRI for the second MRI.

6. An unsupervised learning apparatus applicable to inverse problems, comprising:

a receiving unit configured to receive a training data set; and a training unit configured to train an unsupervised learning-based neural network generated based on an optimal transport theory and a penalized least square (PLS) approach using the training data set, wherein the neural network includes:

a first neural network configured to convert a first magnetic resonance image (MRI) obtained, as an input, from an intermittent Fourier spatial coefficient into a second MRI corresponding to a complete Fourier spatial coefficient;

a Fourier transform unit configured to output a third MRI corresponding to the first MRI by applying a Fourier transform and an inverse Fourier transform to the second MRI; and a second neural network configured to discriminate between the second MRI and an actual MRI for the second MRI.

7. The unsupervised learning apparatus of claim 6, wherein the receiving unit receives the training data set including unmatched data.

8. The unsupervised learning apparatus of claim 6, wherein the neural network is trained via unsupervised learning based on a cyclic loss between the first image and the third image and an adversarial loss between the second image and the actual image.

9. The unsupervised learning apparatus of claim 6, wherein the neural network includes any one of a neural network based on a convolution framelet and a neural network including a pooling layer and an unpooling layer.

* * * * *